Nov. 26, 1968  H. HOEL  3,413,523
PROTECTIVE RELAY FOR AN ELECTRICAL SYSTEM
Filed April 16, 1965  2 Sheets-Sheet 2
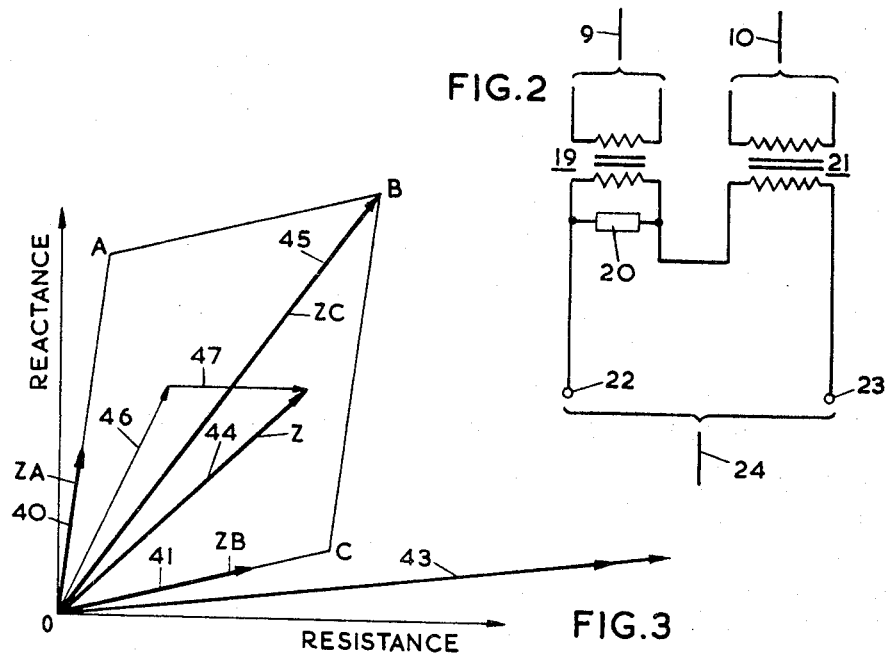
FIG.2
FIG.3
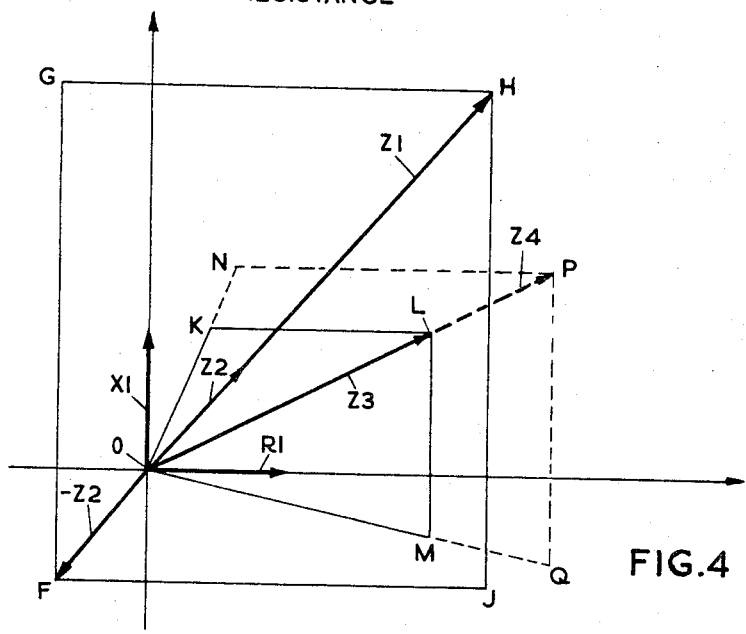
FIG.4

United States Patent Office  3,413,523
Patented Nov. 26, 1968

3,413,523
PROTECTIVE RELAY FOR AN ELECTRICAL SYSTEM
Hans Hoel, Oslo, Norway, assignor to The English Electric Company Limited, London, England, a British company
Filed Apr. 16, 1965, Ser. No. 448,638
Claims priority, application Great Britain, Apr. 28, 1964, 17,643/64
8 Claims. (Cl. 317—27)

ABSTRACT OF THE DISCLOSURE

This invention relates to a protective relay for determining fault conditions by comparing the phase sequence of at least one signal having a vectorial quantity dependent on conditions existing in the system protected and two other signals exhibiting different predetermined vectorial quantities defining limits of operation for the relay. In particular, the limiting vectors are so selected that whenever the first-mentioned vector quantity appears in sequence after a particular one of the limiting vectors and before the other, then this is indicative of a fault. The use of only one signal vector quantity dependent on system conditions provides a coarse degree of protection, and more accurate distance discrimination can be effected by introducing another signal determined by both the vector dependent on said system conditions and another vector having a predetermined magnitude and phase angle, a fault condition occurring within a particular zone then being sensed by the two signals occurring in sequence between the limiting vectors.

According to this invention there is provided a protective relay for an electrical system comprising first means for developing two signals exhibiting different predetermined vectorial quantities which define limiting conditions of operation for said relay, second means for producing at least one signal having a vectorial quantity dependent on conditions existing in said system, and a phase sequence comparator for receiving all said signals and causing the relay to operate and effect a protective function only in response to the occurrence of these signals in a particular phase sequence which is predetermined to be indicative of a fault in said system.

More particularly, the invention provides a protective relay for an electrical system comprising first means for developing two signals exhibiting different predetermined vectorial quantities which define limits of operation for said relay, second means for producing one signal having a vectorial quantity dependent on conditions existing in said system and another signal having a vectorial quantity determined by both the vector dependent on said conditions and another vector having a predetermined magnitude and phase angle, and a phase sequence comparator for receiving all the signals and causing the relay to operate and effect a protective function only in response to both signals from the second means occurring in phase sequence between the two limiting signals from the first means.

A relay incorporating the invention for detecting faults in part of a power transmission line will now be described by way of example and with reference to the accompanying drawings in which:

FIG. 2 shows a circuit diagram of part of the relay;

FIG. 3 is an impedance diagram to aid in the explanation of the operation of the relay; and FIG. 4 is an impedance diagram of the relay.

Figure 1:
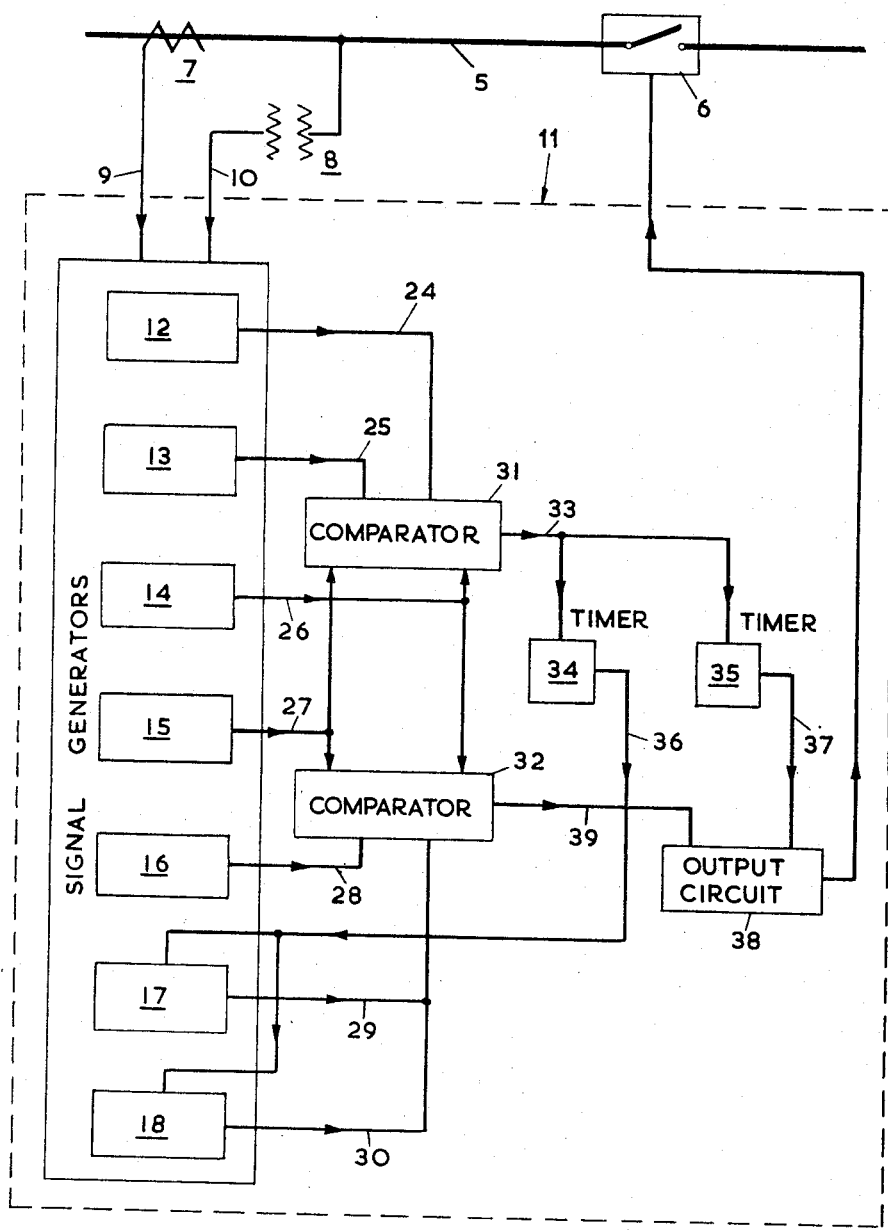
FIG. 1 shows a schematic circuit diagram of the relay in block diagram form.

Referring to FIG. 1, the power line 5 to be protected may be disconnected from the supply in the event of a fault by operation of a circuit-breaker 6. A current transformer 7 and a voltage transformer 8, both represented diagrammatically, supply signals on lines 9 and 10 which are respectively proportional to the line current and voltage. The lines 9 and 10 are connected to the relay 11. Inside the relay 11, the current and voltage signals on the lines 9 and 10 are fed into a number of signal generators 12 to 18 containing circuits to be described.

The circuit diagram of the block 12 is shown in FIG. 2. It comprises a current transformer 19 feeding an impedance 20 of value $Z_1$ ohms, and a voltage transformer 21. The current and voltage transformers are respectively fed by the signals on the lines 9 and 10. If the current in the line 5 (FIG. 1) is I amps and the voltage on the line is E volts, then by virtue of the interconnections between the transformers 19 and 21, the voltage appearing at terminals 22 and 23, and therefore on a line 24, is proportional to $IZ_1-E$.

The circuit of the signal generator 13 is generally similar to that of the signal generator 12 and receives the signals on the lines 9 and 10. The interconnections between the transformers 20 and 21 are reversed, however, and the value of the impedance 20 is $Z_2$ ohms so that the output which appears on a line 25 is proportional to $IZ_2+E$.

The signal generator 14 contains an inductive reactance through which the signal on the line 9 is fed. If the value of the reactance is $X_1$ ohms, then the output from the signal generator 14 on a line 26 is proportional to $IX_1$. The voltage signal on the line 10 is not fed into the signal generator 14.

The signal generator 15 comprises a resistance through which the signal on the line 9 is fed. If the value of the resistance is $R_1$ ohms then the output of the signal generator 15 on a line 27 is proportional to $IR_1$ volts. The voltage signal on line 10 is not fed into the signal generator 15.

The signal generator 16 receives only the voltage signal on the line 10. It contains a phase shifting network so that the output signal on a line 28 is proportional to E but is shifted through a phase angle of minus 10°. The output signal on the line 28 will be referred to as $E_{-10}$.

The signal generators 17 and 18 both receive signals on the lines 9 and 10. Both contain circuits similar to that illustrated in FIG. 2, the value of the impedance 20 being $Z_3$ ohms in the case of signal generator 17 and $Z_4$ ohms in the case of signal generator 18. The outputs produced on lines 29 and 30 are therefore respectively proportional to $IZ_3-E$ and $IZ_4-E$ volts.

The outputs from the signal generators 12 and 13 are connected to a sequence comparator 31 and the outputs from the signal generators 16, 17 and 18 are connected to a sequence comparator 32. The outputs of the signal generators 14 and 15 are connected to both comparators 31 and 32. Each comparator produces an output when the incoming signals occur in predetermined time sequences, that is, their phase angles have a predetermined relationship. The output of the comparator 31 on a line 33 controls a timer 34 and a timer 35. A signal on line 33 initiates both timers. At the end of a predetermined period of time, the timer 34 produces an output signal on the line 36 which renders effective the signal generator 18 and renders ineffective the signal generator 17; in the absence of the signal from the timer 34 on the line 36 the signal generator 17 is effective and the signal generator 18 is ineffective. At the end of a different predetermined time, the timer 35 produces an output on a line 37 which activates an output circuit 38. When activated, the output circuit trips the circuit-breaker 6, thus disconnecting the line 5 from the supply. An output from the comparator 32 on a line 39 also activates the output circuit 38.

Before explaining the operation of the relay in detail, a description of the principle involved in the invention will be given with reference to FIG. 3.

FIG. 3 shows an impedance diagram in which the vertical axis represents reactance and the horizontal axis represents resistance. Two vectors 40 and 41 represent predetermined impedances of value ZA and ZB ohms respectively having predetermined phase angles with respect to a datum, the horizontal axis. A vector 43 represents the impedance of the power line and its load, the load being assumed, as will normally be the case, to be mainly resistive. When a short-circuit occurs on the line, the impedance of the line will change; the impedance of the line, which is mainly reactive, together with the impedance of the fault is then represented by the vector 44 representing an impedance of Z ohms. The magnitude and phase angle of the vector 44 depend on the position and type of fault.

If the three vectors ZA, ZB and Z are continuously compared in a sequence comparator and the comparator is arranged to produce an output when and only when it detects that the sequence of vectors is ZA, Z, ZB, that is, vector Z has a phase angle referred to the datum greater than vector ZB and less than vector ZA, then such an output signal could indicate a fault on the line or occurrence of a particular load condition having greatly reduced resistive effect. Such a signal would indicate a fault at any position along the whole length of the line, that is, the signal would be produced irrespective of the value of Z provided it occurs in sequence after ZA and before ZB; such an arrangement is not normally practical for fault detection because normally a protective relay is required to detect faults occurring only within certain limits of the line and to be unaffected by load conditions.

If now, a third vector 45 representing an impedance ZC ohms, and having a predetermined phase angle such that it occurs in sequence after ZA and before ZB, is produced and the sequence comparator modified so that it produces the above-mentioned output signal when, and only when, both the vectors $Z$ and $ZC-Z$ occur after ZA and before ZB, then it can be shown that the output signal will be produced when, and only when, Z lies within the parallelogram OABC. The vector $ZC-Z$ may be represented by a line joining the end of vector Z with the point B. The vector Z may occur in the sequence before or after the vector $ZC-Z$: as long as both occur after ZA and before ZB, then the vector Z must lie within the parallelogram. Therefore, by producing the vector ZC and modifying the comparator operation as described, the arrangement will detect faults occurring within a particular length of line, the length being limited by the value of the impedance ZC. The values of the impedances ZA and ZB will not affect the size of the parallelogram but the angle between them determines the angle of the parallelogram.

The parallelogram shape, such as illustrated in FIG. 3 of the characteristic of a protective relay is very advantageous. The vector 44, representing the impedance of the line on occurrence of a fault may, for example, be considered to be made up of a mainly inductive portion 46, representing the actual impedance of the line, plus a resistive portion 47 representing the resistance of an arc fault to earth: therefore the parallelogram shape is similar to the shape of the area within which vector 44 is likely to occur and thus is well suited to enabling the effect of arc faults on the impedance of the line to be detected.

In practice, the impedance of the line is measured by measuring the line current and voltage, referred to as I and E respectively. It will be seen that (by multiplying ZA, ZB and ZC by I) the fault condition, that is, the condition that both $Z$ and $ZC-Z$ should occur after ZA but before ZB, may be stated in another way, that is, that both $E$ and $IZC-E$ should occur after IZA but before IZB.

The detailed explanation of the operation of the relay will now be given with reference to the impedance diagram of FIG. 4. The vectors $Z_1$, $Z_2$, $Z_3$, $Z_4$, $X_1$ and $R_1$ illustrated correspond with the impedance values already given in the description of the relay. The relay operates in a manner generally similar to that described with reference to FIG. 3. Its impedance diagram, has however, three vectors $Z_1$, $Z_3$ and $Z_4$, each corresponding with the single vector ZC of FIG. 3: these three vectors give the relay three different zones of operation and, as will become apparent, the relay is thus able to detect faults occurring within different lengths of the line all measured from the same point. The impedance diagram of FIG. 4 also has vector $Z_2$ the purpose of which is to "offset" the characteristic. The vectors $X_1$ and $R_1$ in FIG. 4 correspond respectively with the vectors ZA and ZB of FIG. 3 for determining conditions of operation.

In operation, the line current and voltage are continuously monitored by the current and voltage transformers 7 and 8 (FIG. 1) and appropriate signals are supplied to the signal generators 12 to 18.

The comparator 31 continuously receives outputs from the signal generators 12 to 15 and compares the sequence of the vectors $IZ_1-E$ (produced in signal generator 12), $IZ_2+E$ (produced in signal generator 13), $IX_1$ (signal generator 14), and $IR_1$ (signal generator 15). It is arranged to produce an output, when, and only when, it detects that the sequence of vectors is such that the vectors $IZ_1-E$ and $IZ_2+E$ occur after $IX_1$ and before $IR_1$. This is the same as detecting when, and only when, both the vector $Z_1-Z$ (where Z is the effective impedance of the line as determined by the ratio of E and I) and the vector $Z_2+Z$ occur after $X_1$ and before $R_1$. Reference to FIG. 4, and to the explanation given with reference to FIG. 3 shows that the signal comparator will therefore detect all cases where Z lies within the rectangle FGHJ (the limits FG being parallel to $X_1$ and FJ being parallel with $R_1$) and will thus detect whenever faults occur on a certain length of line. The rectangle FGHJ corresponds with the parallelogram OABC of FIG. 3 though it will be seen that no vector corresponding to vector $Z_2$ is shown in FIG. 3.

The output from the comparator 31 initiates the timers 34 and 35. The timer 35 produces an output signal on the line 37 at the end of its predetermined period which causes the output circuit 38 to trip the circuit breaker thus disconnecting the line from the supply. It will be appreciated, however, that the value of the impedance $Z_1$ is such that the comparator 31 detects faults occurring on a section of the line of sufficient length to include part of the line protected by another relay. Normally, therefore, this other relay, being near to the fault, will then trip the circuit breaker before the end of the predetermined period of the timers 35.

The sequence comparator 32 continuously monitors output signals from the signal generator 14, 15, 16 and 17 and measures the sequences of the vectors $IX_1$ produced in the signal generator 14), $IR_1$ (produced in the signal generator 15), $E_{-10}$ (signal generator 16) and $IZ_3-E$ (signal generator 17). It is arranged to produce an output when, and only when, it detects that the sequence of vectors is such that both the vector $E_{-10}$ and $IZ_3-E$ occur after $IX_1$ and before $IR_1$. This is the same as detecting when, and only when, both the vector $Z_{-10}$ (that is, the impedance of the line shifted through a phase angle of $-10°$) and the vector $Z_3-Z$ occur after $X_1$ and before $R_1$. FIG. 4 shows that this sequence measurement will therefore detect all cases when Z lies within a four-sided figure OKLM (KL being parallel to $R_1$ and LM being parallel with $X_1$) and will thus detect whenever faults occur within a certain, shorter, length of line. Again, the figure OKLM corresponds with the parallelogram OABC in FIG. 3 though its shape is not that of the parallelogram due to the shifting of the vector E by a phase angle of $-10°$. The shape of the figure OKLM is advantageous in that it enables the relay to detect easily arc faults occurring very close to the point of the line at which the line current and voltage are measured.

If the comparator 32 detects a fault, it activates the output circuit 38 which immediately trips the circuit breaker 6.

When the timer 34 produces the output signal on the line 36 at the end of its predetermined period the signal generator 18 is rendered effective and the signal generator 17 ineffective. The comparator 32 therefore takes note of the phase angle of the vector $IZ_4-E$, instead of vector $IZ_3-E$ and thus detects whenever the vector Z lies within the four-sided figure ONPQ (NP being parallel with $R_1$ and PQ being parallel with $X_1$): the comparator therefore detects faults occurring in a length of line longer than that detected before the timer 34 has produced its output signal.

The relay thus has three operating zones, Zone 1, Zone 2 and Zone 3 or the starting zone. When the relay is operating in Zone 1 it will detect faults anywhere in a length of line corresponding to the length of the vector $Z_3$: this length of line extends for about 85% of the distance from the relay to the next relay connected to the line. Should a fault occur on this length of line, the relay will immediately operate as described causing the output stage 38 (FIG. 1) to trip the circuit breaker 6.

When the relay is operating in Zone 2 it will detect faults anywhere in a length of line corresponding to the length of the vector $Z_4$: this length of line extends to a distance greater than the length from the relay to the next relay. The relay does not start operating in Zone 2 until activated by the output from timer 34.

When the relay is operating in Zone 3 or the starting Zone, it will detect faults anywhere in a length of line corresponding to the lengths of the vectors $Z_1$ and $Z_2$: this length of line extends from the relay beyond the length of line protected by the next relay as well as into the length of line protected by the preceding relay.

The relay is always operating in both the starting Zone and in Zone 1. If there is a fault in the length of line protected by Zone 1 the relay immediately operates to trip the circuit breaker. If the fault is outside Zone 1 but inside the starting Zone, the timers 34 and 35 are initiated. At the end of the predetermined period timer 34 causes the relay to operate to operate in Zone 2 and if the fault is within Zone 2, the relay operates to trip the circuit breaker. If the fault is not within Zone 1 or Zone 2, but still within the starting Zone, then at the end of the predetermined period of timer 35, the relay will trip the circuit breaker: normally, however, the circuit breaker will have been tripped before this by one of the other relays since the fault lies in a section of line protected by one of them. The extension of the starting Zone of the relay so as to include sections of the line protected by other relays, and the provision of the timer 35, provides a back-up protection should the other relays fail to operate.

A relay as described has an operating impedance characteristic made up of straight lines as shown: this is advantageous in that it is possible to make the shape of the characteristic more nearly to the ideal form. Furthermore, it can be shown that such a relay is not affected by changes in the D.C. level of the line current or voltage provided that such D.C. levels are accurately transmitted by both the transformers 7 and 8.

The relay may be modified by arranging for some or all of the signal generators 12 to 18, in particular the generators 14 and 15, to be energised from the line voltage instead of the line current. In such a case, the relay may have an operating impedance characteristic including circles or parts of circles and other curved lines. In other words, a straight line characteristic may be obtained on an admittance diagram instead of an impedance diagram.

The vector sequences which the comparators 31 and 32 are required to detect depend on the purpose for which the relay is designed to operate and need not necessarily be as described.

What I claim as my invention and desire to secure by Letters Patent is:

1. A protective relay for an electrical system comprising:
   first means for developing two signals exhibiting different predetermined vectorial quantities which define limiting conditions of operation for said relay,
   second means for producing at least one signal having a vectorial quantity dependent on conditions existing in said system, and
   a phase sequence comparator for receiving all said signals and causing the relay to operate and effect a protective function only in response to the occurrence of these signals in a particular phase sequence which is predetermined to be indicative of a fault in said system.

2. A protective relay according to claim 1, wherein said signal from the second means is dependent only on the impedance of the system.

3. A protective relay for an electrical system comprising:
   first means for developing two signals exhibiting different predetermined vectorial quantities which define limits of operation for said relay,
   second means for producing one signal having a vectorial quantity dependent on conditions existing in said system and another signal having a vectorial quantity determined by both the vector dependent on said conditions and another vector having a predetermined magnitude and phase angle, and
   a phase sequence comparator for receiving all the signals and causing the relay to operate and effect a protective function only in response to both signals from the second means occurring in phase sequence between the two limiting signals from the first means.

4. A protective relay according to claim 3, wherein the said one signal produced by the second means is determined by the impedance of the system and the said other signal is constituted by the sum of, or the difference between, the impedance of the system and the said vector having the predetermined magnitude and phase angle.

5. A protective relay according to claim 4, comprising:
   third means for producing two further signals determined by both the impedance vector and by other vectors having different predetermined magnitudes and phase angles, and
   an additional phase sequence comparator for receiving the two limiting signals and the said two further signals, the additional comparator being operative to cause the relay to effect a protective function only in response to both said further signals occurring in phase sequence between the limiting signals.

6. A protective relay according to claim 5, comprising:
   timing means responsive to the output from one of the comparators to condition the other comparator for operation following a predetermined time delay.

7. A protective relay for an electrical system comprising:
   first means for developing two signals exhibiting different predetermined vectorial quantities which define limits of operation for said relay,
   second means for producing one signal having a vectorial quantity dependent on the impedance of said system and at least one other signal having a vectorial quantity determined by the sum of, or the difference between, the impedance vector and another vector having a predetermined magnitude and phase angle.
   third means for producing two signals having vectorial quantities determined by the sum of, or the difference between, said impedance vector and further vectors having different predetermined magnitudes and phase angles,
   a first phase sequence comparator for receiving the signals from the first and third means,
   a second phase sequence comparator for receiving the signals from the first and second means, and
   a timing device, said first comparator being operative to actuate said timing device and cause said relay to effect a protective function after a first time interval in response to both signals from the third means occurring in phase sequence between the limiting signals from the first means, and said timing device being operative successively to apply all the said other signals to the second comparator in a predetermined order after different time intervals shorter than said first interval whereby said second comparator causes the relay to effect said protective function in response to said one signal together with any one of said other signals occurring in phase sequence between said limiting signals.

8. A protective relay aucording to claim 7, wherein each vector having the said predetermined magnitude and phase angle defines a distance boundary within which faults occurring in the system may be detected.

References Cited

UNITED STATES PATENTS 2,879,454 3/1959 Hodges et al. _____ 317—36 X
3,248,609 4/1966 Gambale _____ 317—47 X LEE T. HIX, *Primary Examiner.*

J. D. TRAMMELL, *Assistant Examiner.*